(12) United States Patent
Grove et al.

(10) Patent No.: US 7,607,062 B2
(45) Date of Patent: Oct. 20, 2009

(54) SYSTEM FOR FAST RECOVERY FROM LOSSES FOR RELIABLE DATA COMMUNICATION PROTOCOLS

(75) Inventors: Adam J. Grove, Menlo Park, CA (US); Michael Kharitonov, New York, NY (US); Alexei Tumarkin, Santa Barbara, CA (US)

(73) Assignee: Akamai Technologies, Inc., Cambridge, MA (US)

(*) Notice: Subject to any disclaimer, the term of this patent is extended or adjusted under 35 U.S.C. 154(b) by 554 days.

(21) Appl. No.: 10/397,679

(22) Filed: Mar. 25, 2003

(65) Prior Publication Data

US 2004/0008693 A1 Jan. 15, 2004

Related U.S. Application Data

(60) Provisional application No. 60/366,867, filed on Mar. 25, 2002.

(51) Int. Cl.
 *H04L 1/18* (2006.01)
(52) U.S. Cl. .................. 714/748; 714/749; 714/750; 370/474
(58) Field of Classification Search ......... 714/748–751; 370/474
See application file for complete search history.

(56) References Cited

U.S. PATENT DOCUMENTS

| 5,084,877 | A | 1/1992 | Netravali et al. |
| 5,958,053 | A | 9/1999 | Denker |
| 6,112,323 | A | 8/2000 | Meizlik et al. |
| 6,317,854 | B1 | 11/2001 | Watanabe |
| 6,567,388 | B1* | 5/2003 | Tomcik et al. ............. 370/335 |
| 6,581,176 | B1* | 6/2003 | Seo ........................... 714/749 |
| 6,615,382 | B1* | 9/2003 | Kang et al. ................ 714/748 |
| 7,028,094 | B2* | 4/2006 | Le et al. .................... 709/230 |
| 7,050,437 | B2* | 5/2006 | Bilic et al. ................. 370/394 |
| 7,162,541 | B2* | 1/2007 | Koo et al. .................. 709/245 |
| 2002/0069388 | A1* | 6/2002 | Niu et al. ................... 714/748 |

* cited by examiner

*Primary Examiner*—Guy J Lamarre
(74) *Attorney, Agent, or Firm*—David H. Judson

(57) ABSTRACT

Fast recovery from losses is an important problem for reliable data communication protocols. The Internet standard TCP protocol (Transmission Control Protocol) implements two algorithms for that: an original one based on a special timer, and a later addition to TCP that is triggered when there are three packets received by the client after the missing one. Web communications are most frequently carrying rather small objects that are generally ineligible for anything other than timeout-based retransmission schemes. The present invention describes a system delivering performance improvements to TCP (and other reliable data communication protocols) that are compliant with present Internet standards. One improvement is to send duplicates of packets without waiting for a timeout to occur. Another is to split particular parts of a data stream into smaller packets. A third is to send packets out-of-order to force the remote host to acknowledge all packets that were successfully received.

22 Claims, 6 Drawing Sheets

SYSTEM FOR FAST RECOVERY FROM LOSSES FOR RELIABLE DATA COMMUNICATION PROTOCOLS

This application claims priority to the provisional patent application entitled "System for Fast Recovery from Losses for Reliable Data Communication Protoclos", Ser. No. 60/366,867, filed Mar. 25, 2002.

LIST OF ABBREVIATIONS

ACK—acknowledgment (special TCP packet confirming a successful receipt of the data from a remote host).

HTTP—hypertext transfer protocol (a high-level application protocol that uses TCP).

RFC—request for comment (specification documents of the Internet protocol suite, as defined by the Internet Engineering Task Force (IETF) and its steering group the IESG, are published as RFCs).

RTO—retransmission timeout (time interval after which the data should be resent).

RTT—round-trip time (time a packet needs to travel to a remote host and back).

SYN—synchronize flag (request for opening a TCP communication).

SYN-ACK—an ACK for SYN packet (otherwise not different from other ACKs).

TCP—Transmission Control Protocol (The Internet's primary transport protocol, generally built upon the lower-level Internet Protocol (IP), and providing reliable connection-oriented communication service).

FIELD OF THE INVENTION

The invention relates generally to data communication networks, such as the Internet, involving a pair of host computers exchanging data using a reliable protocol such as TCP. The invention concerns means of achieving reliability when the protocol is used over potentially lossy or noisy underlying channels.

BACKGROUND OF THE INVENTION

In the following discussion, we refer to the host computer that originated the request to open a communication channel to the remote host computer as a client, while we refer to the remote host computer which accepted this request from the client as a server. In many reliable data communication protocols, such as TCP, the server controls the timing and rate with which it sends data to the client according to special messages (so-called ACKs) that acknowledge the receipt of previous data packets by the client. The following discussion uses a Web communication sequence carried by HTTP over TCP to illustrate a set of problems common to a wide range of reliable transport protocols.

In order to establish a communication channel to the server, the client first sends a special message to the server requesting it to open a connection. This message is named SYN in TCP. The server confirms its readiness to do that by sending an acknowledgement. This message is called SYN-ACK in TCP. The client then initiates the actual request for data, thereby acknowledging the response from the server. In TCP the actual request for data may be made by transmitting the message HTTPGET from the client; and in some realizations of TCP, two separate packets are transmitted: one containing the ACK for SYN-ACK, and the other one carrying the HTTP GET request. After these steps, the server starts sending packets of data to the client. The rate of sending the data from the server is governed by protocol-specific algorithms ("slow-start" and "congestion avoidance" in the case of TCP) utilizing acknowledgments (ACKs) received by the server for the packets that were successfully received by the client. Since different packets may take different paths from the server to the client, they may arrive in a different order from that in which they were sent. To enable the client to put the packets in proper sequential order, the packets or the data contained within the packets are typically numbered sequentially by the server.

Operating details for the Internet protocol suite are set forth in a series of Requests for Comments (RFC) defined by the Internet Engineering Task Force (IETF). RFC 2581 prescribes that ACKs be generated in TCP for at least every other full-size packet and all out-of-order packets:

"ACK SHOULD be generated for at least every second full-sized packet, and MUST be generated within 500 ms of the arrival of the first unacknowledged packet. Out-of-order data packets SHOULD be acknowledged immediately, in order to accelerate loss recovery. To provide feedback to senders recovering from losses, the receiver SHOULD send an immediate ACK when it receives a data packet that fills in all or part of a gap in the sequence space."

If a packet of data, or an ACK for it, is lost then the server is required to retransmit the missing data. Most often retransmission only happens after a certain amount of time specified by the protocol standards following initial transmission of the data. Thus, the entire time out period represents lost transmission time. RFC 3046 describes the time-out problem as follows:

"TCP's retransmission timeout (RTO) is based on measured round-trip times (RTT) between the sender and receiver. To prevent spurious retransmissions of packets that are only delayed and not lost, the minimum RTO is conservatively chosen to be 1 second. Therefore, it behooves TCP senders to detect and recover from as many losses as possible without incurring a lengthy timeout when the connection remains idle."

For land-based communication networks typical RTTs are on the order of 100 milliseconds or less. The timeout period typically ranges from 1 to 3 seconds for TCP communications. Thus, the penalty for entering a timeout state is substantial. The goal of the present invention is to reduce the possibility that the client or the server enters this costly timeout state.

Recent implementations of TCP are enhanced by addition of a "fast retransmit" feature. This feature enables a server to avoid timeout by retransmitting a lost packet whenever the server receives acknowledgments from the client, triggered by at least three packets sent after the packet for which an acknowledgement is missing. TCP's fast retransmit system is representative of a broad class of recovery mechanisms which all rely on at least one (in the case of TCP, in fact 3) subsequent packets making it through successfully and triggering acknowledgements after an earlier packet has been lost. However, as RFC 3046 concedes if there are less than three subsequent packets "in flight" after the lost packet; this solution does not work.

"If not enough duplicate ACKs arrive from the receiver, the Fast Retransmit algorithm is never triggered—this situation occurs when the congestion window is small or if a large number of packets in a window are lost. For instance, consider a congestion window (cwnd) of three packets. If one packet is dropped by the network, then at most two duplicate ACKs will arrive at the sender. Since three duplicate ACKs are required to trigger Fast Retransmit, a timeout will be required to resend the dropped packet."

Here, a "duplicate ACK" is an ACK sent by the client repeating acknowledgement of earlier data. In TCP and similar protocols a duplicate ACK is sent by the client when it receives a packet containing other than the next data expected in sequence.

Unfortunately, with current communication practices, on average less than half of lost packets are eligible for fast retransmit recovery. See Hari Balakrishnan, Venkata Padmanabhan, Srinivasan Seshan, Mark Stemm, and Randy Katz, "TCP Behavior of a Busy Web Server: Analysis and Improvements", *Proc. IEEE INFOCOM Conf.* (San Francisco, Calif., March 1998.)

It is noteworthy that the problems cited here are most prominent when: the total amount of data to be sent is small (so that the server has relatively few packets to send); near the end of a transmission (e.g. for the final few packets of a flow); near the start of a transmission (where TCP's "slow-start" feature places additional limits on the number of packets in flight); and when receivers have limited buffer capacity (when their TCP receive "window" is small).

SUMMARY OF THE INVENTION

The invention presents several approaches to reducing the time it takes to recover from lost packets. The first is based on sending duplicates of the packets without waiting for a timeout to occur. The second splits particular parts of a data stream into smaller packets. The third sends packets out-of-order to force the remote host to acknowledge all those packets which were successfully received.

BRIEF DESCRIPTION OF THE DRAWINGS

These and other objects, features and advantages of the invention will be more readily apparent from the following detailed description of preferred embodiments of the invention in which.

DETAILED DESCRIPTION OF THE PREFERRED EMBODIMENTS

The invention can be applied to any protocol such as TCP, where reliable delivery is required and a system of explicit acknowledgements is used to ensure reliability in the face of packet loss. A preferred embodiment of the invention involves improvements to a standard TCP implementation fully compatible with Internet standards. The following description uses a web-based communication sequence carried by HTTP over TCP. Only server-side implementations are described, although similar modifications can be applied to the client's side.

Figure 1:
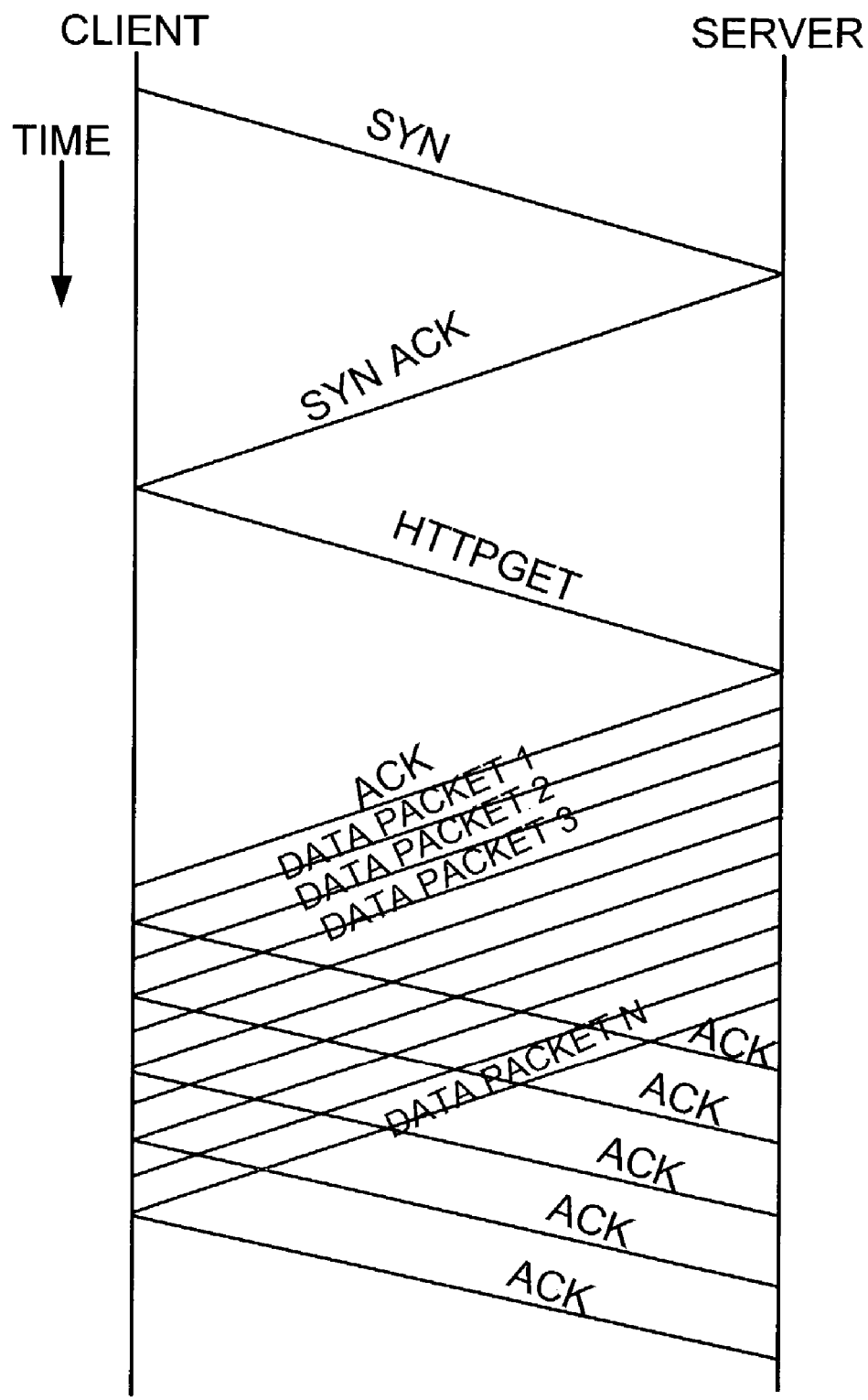
FIG. 1 is a timing diagram indicating message flow between client and server in prior art implementations of TCP.

FIG. 1 depicts the message flow between a client and a server in a conventional protocol such as TCP. The client initiates the communication session by sending a SYN message to the server requesting it to open a connection. If the server is ready to open the connection, it responds by sending a SYN-ACK to the client. The client then requests data from the server by sending HTTPGET to the server. This message implicitly acknowledges receipt of the SYN-ACK message and in some realizations of TCP an explicit acknowledgement of the SYN-ACK message may also be transmitted. Thereafter, the server transmits data to the client typically in bursts or windows of full-sized data packets. At a minimum, every other full-sized data packet is acknowledged by the client which transmits an ACK message to the server.

Possible losses of packets can occur at the following stages.
SYN is lost;
SYN-ACK is lost;
Data request is lost;
ACK for a data request is lost;
A packet of data is lost; and
ACK for a packet of data is lost.

In prior art systems, timers are started at the client or the server when a message is sent out and a failure to communicate is recognized if no response is received before the timer times out. Typically, the timeout period is several times the expected round trip time for communication with the other host computer. If the timeout period expires, the message is then resent. Of course, the server can do nothing in the first case (when SYN is lost), or when it has not received a request for data. The present invention proposes for the client to mitigate the impact of losses in such situation by sending duplicate SYN packets or data requests.

The following approaches to preventing timeouts are described below: 1) duplication; 2) non-standard packetization; and 2) intentional reordering of data packets.

Duplication of Certain Packets

This approach is based on the theory (supported by numerous systematic Internet measurements) that the probability of losing two identical packets sent within a configurable but small amount of time from each other is the roughly the square of the individual packet loss rate. For instance, if packet loss occurs at 1% (a typical value) then two such packets will both be lost with probability near 0.01*0.01=0.0001=0.01%.

Duplication of SYNs

In this embodiment of the invention, the client sends a duplicate of the SYN packet to the server after a certain time after the original one. The time after the initial SYN can be a configurable constant (say, 0) or a variable depending, for example, on the previous session's RTT to the server. In particular, if the client has never contacted the server before, then the only possibility is to use the former (constant SYN retransmit timeout) method. If the client has stored previous measurements of RTT to the server, it can re-send a duplicate of the SYN whenever it does not receive any data from the server within 2 times RTT, or RTT+(small number) time frame.

Duplication of SYN-ACKs

In this version of the invention, the server sends a duplicate of the SYN-ACK packet to the client a certain time after sending the original one. The time after the initial SYN-ACK can be a configurable constant (say, 0) or a variable depending, for example, on the previous session's RTT to the client. In particular, if the client has never contacted the server before, then the only possibility is to use the former (constant SYN-ACK retransmit timeout) method. If the server has stored previous measurements of RTT to the client, it can resend a duplicate of the SYN-ACK whenever it does not receive any data from the client within 2 times RTT, or RTT+ (small number) time frame.

Duplication of Data Requests

The client may also send to the server a duplicate of the data request a certain time after sending the original data request. The time after the initial data request can be a configurable constant (say, 0), or a variable depending, for example on the RTT for the SYN and SYN-ACK signals that were just used to establish communication with the server.

Duplication of ACKs for Data Requests

The server sends a duplicate of the ACK packet to the client acknowledging the receipt of the request for data a certain time after sending the original one. This procedure works similarly to the procedure for duplicating SYN-ACK.

It will be appreciated that the use of duplicate SYN, SYN-ACK or data request signals will not significantly lengthen the time required to start transmission of data packets from the server if the duplicate messages closely follow the original message. For TCP/IP the length of the header and thus the length of the smallest TCP packets such as SYNs and SYN-ACKs is 40 bytes. The transmission of 40 bytes over a 56 Kbps modem link takes from 6 to 10 milliseconds depending mostly on the quality of the line.

Duplication of Last Data Packets

TCP data packets are sent in bursts or windows. A maximum number of packets in a send window is calculated according to a special algorithm that takes into account the whole history of the communication between the server and the client including losses, advertised buffer sizes, etc. For further details, see D. E. Comer, *Computer Networks and Internets*, § 14.10 and ch. 22 (Prentice Hall 1999) which is incorporated herein by reference. In accordance with one embodiment of the present invention, the server sends a duplicate of the last packet of each window to the client a certain time after sending the original one. The time after sending the original packet can be a configurable constant (say, 0) or a variable depending, for example, on the RTT measurements to the client similar to the algorithm for duplicating SYN-ACKs. It is also possible to duplicate the last N packets, for some fixed value of N greater than one (e.g. N=2 or 3).

This aspect of the invention addresses the issue that neither TCP fast recovery, nor any other mechanism in the same class is useful for the "final" packets in a send window because no subsequent packets is known to be in the send window. The penalty for duplicating data packets is that much more bandwidth is required to transmit a data packet than is required to transmit a SYN, an ACK or a data request signal. The disadvantages of these additional requirements must be carefully weighed against the advantages of increased reliability of communications.

Figure 2:
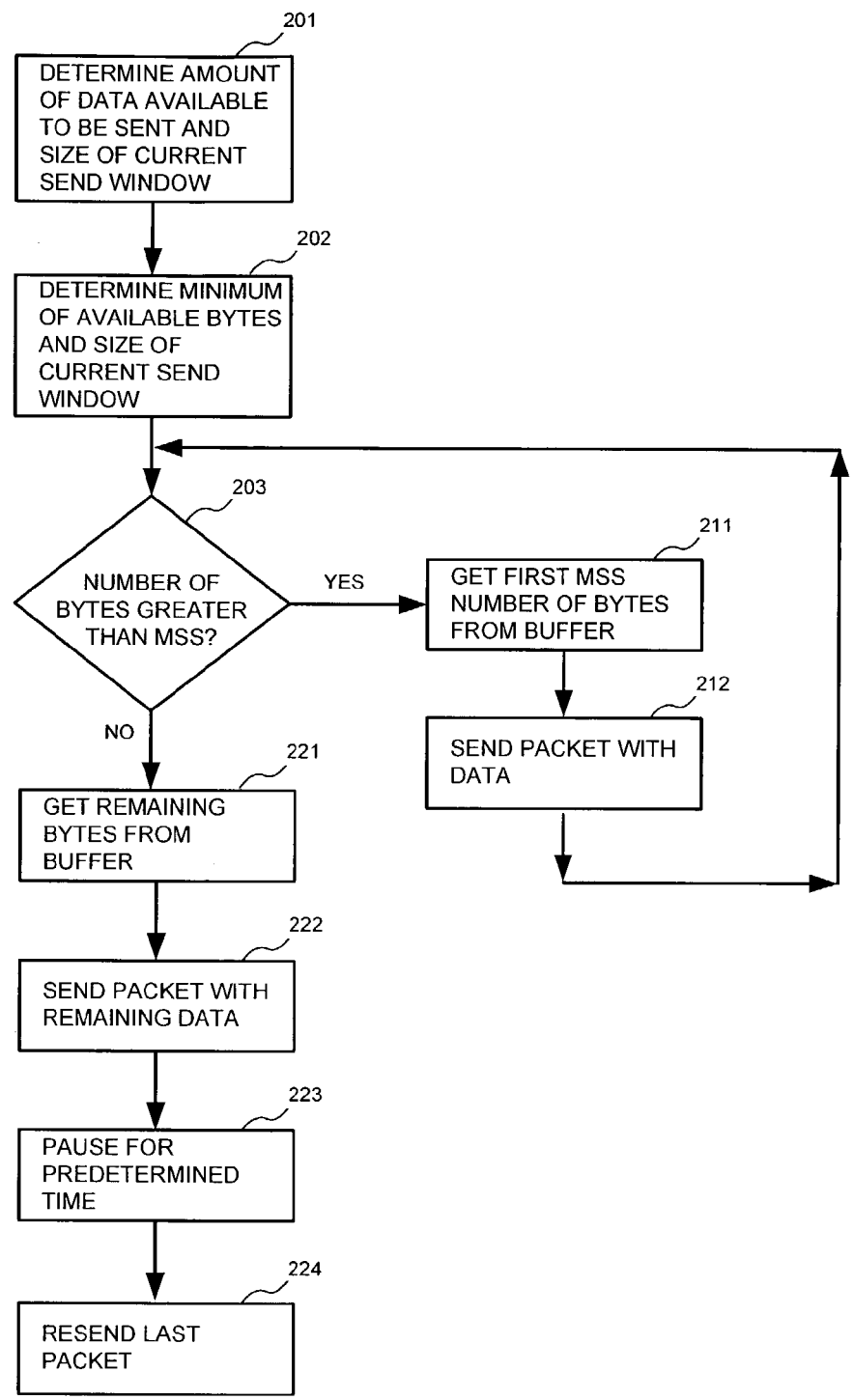
FIG. 2 is a flow chart depicting one implementation of the invention.

FIG. 2 is a flowchart depicting the processing of messages in communication between client and server in an illustrative embodiment of the invention. At step 201, the sending host determines the amount of data available to be sent and the size of the current send window. At step 202, the number of bytes of data to be sent is determined as the minimum of the number of bytes of data available to be sent and the size of the send window. A test is then made at step 203 whether the number of bytes remaining to be sent exceeds the maximum segment (MSS) that can be transmitted in a data packet. If the data to be transmitted exceeds MSS, then the sending host at step 211 gets the first MSS bytes to be sent and packetizes this data and sends it at step 212. The host then returns to step 203.

When the test at step 203 finally fails, the sending host retrieves the remaining bytes from the buffer at step 221, and packetizes these bytes and sends them at step 222. Thereafter, it pauses at step 223 for a predetermined period of time. Finally, at step 224, it resends the packet that was sent at step 222.

Variations may be made in the practice of the invention so that only certain messages such as those at the beginning of the transmission session or those at the very end are duplicated.

Figure 3:
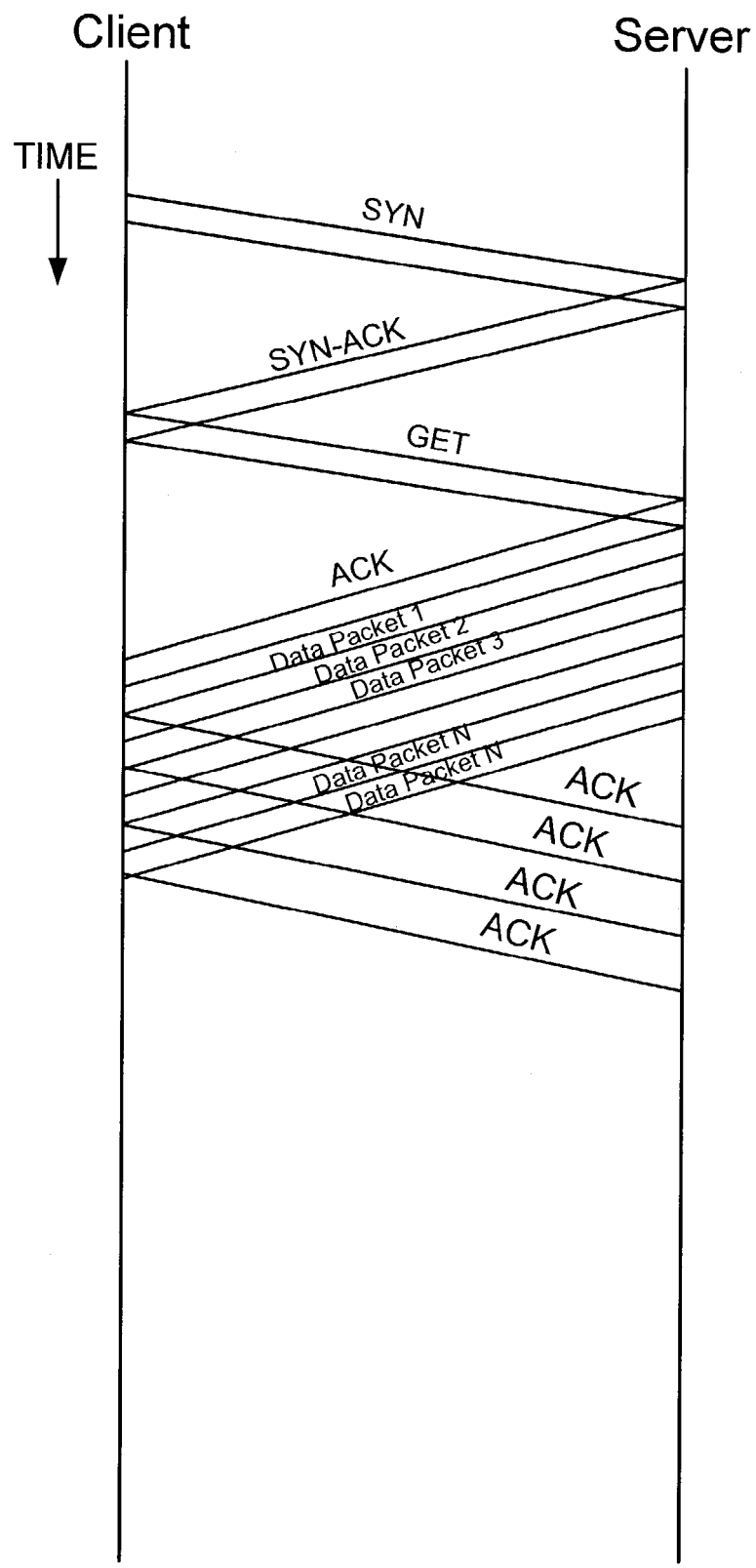
FIG. 3 is a timing diagram indicating message flow between client and server in a first preferred embodiment of the invention.

FIG. 3 is a timing diagram illustrating the duplication of the SYN, SYN-ACK, data request and ACK for data request signals in accordance with the preferred embodiment of the invention. FIG. 3 also illustrates the duplication of the last data packet in a window.

In the normal case, of course, both messages (the original and its duplicate) reach the client. However, transport protocols such as TCP are designed to be resilient to duplication (which occurs anyway within the Internet from time to time) and will simply ignore the second copy of the message that is received.

Special Packetization and Duplication

In another aspect of the invention, the costly overhead of resending the whole last data packet twice is avoided by duplicating and sending twice only the last byte (or last few bytes) of the last data packet. The purpose of this approach is for the server to elicit a response from the client that could trigger a fast retransmit procedure for a lost last data packet. Specifically, along with preparing the last packet of data, the server prepares 3 packets: a first packet containing just the third-to-last byte of data; a second packet containing just the second-to-last byte of data; and a third packet containing just the last byte of data. Then, the server sends the complete last packet of the data and the three smaller packets described above. If the last complete packet with data is lost, and all single-byte trailing packets are received by the client and trigger acknowledgements, then the fast retransmit algorithm is operative.

It is also possible to combine this approach with other more aggressive retransmit procedures that will require duplicating not three but only two (or even one) of the last bytes of the last packet.

Figure 4:
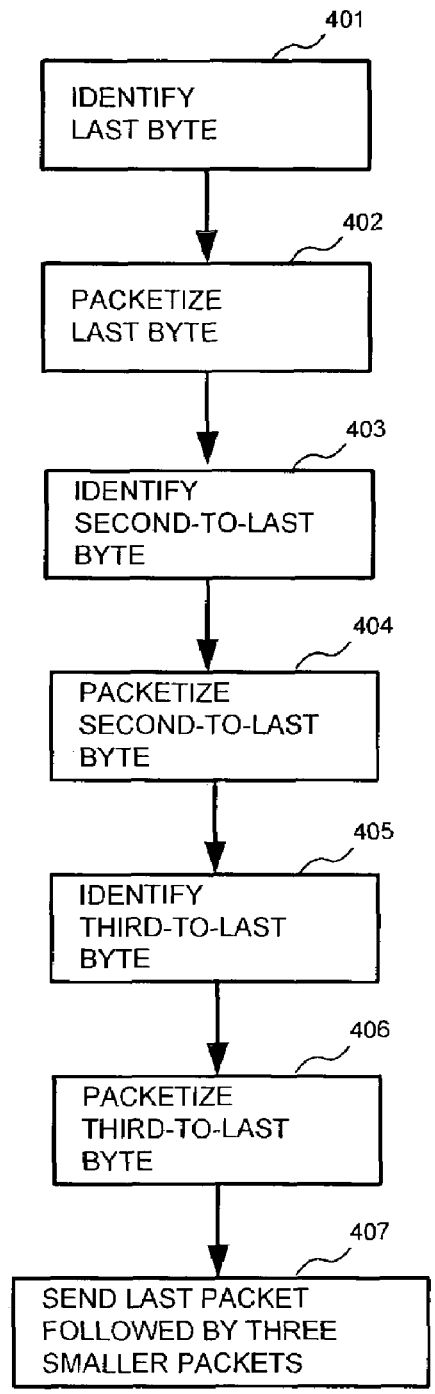
FIG. 4 is a flow chart depicting another implementation of the invention.

FIG. 4 is a flowchart depicting the processing of the last packet of data in accordance with this embodiment of the invention. Upon detecting the last packet of data, the sending host locates the last byte of data at step 401, packetizes the last byte at step 402, locates the second-to-last byte of data at step 403, packetizes this byte at step 404, locates the third-to-last byte of data at step 405 and packetizes this byte at step 406. At step 407, the last packet is then sent, followed by the three smaller packets carrying the third-to-last, second-to-last and last byte of data.

Special Intentional Reordering and Packetization

In another aspect of the invention, special data packets are used at the end of a transmission window and the packets are intentionally transmitted out-of-order.

For example, the server can be instructed to send the last two packets in a window in reverse order. As a result, the client will be forced to acknowledge both of these packets immediately (see a citation from RFC 2581 quoted above). An absence of an ACK for any one of these packets is used to trigger an immediate resending of the missing packet. A difference from sending packets in-order is that with in-order delivery TCP is not always obligated to send an ACK immediately on receipt of a packet. Accordingly, a primary advantage of the proposed reordering scheme is that the server can use shorter timeout settings before determining whether a packet needs to be retransmitted.

However a straightforward application of the above-described procedure has certain drawbacks and shortcomings. First of all, it can be applied only to situations when there are two or more packets to be sent. Second, the client's application will not receive the data until both of the reordered packets are successfully received. That might affect the client's performance even when there are no losses on the link between host computers, particularly when the client's bandwidth is restricted (such as in the case of phone modem users). Therefore the present invention preferably employs the reordering approach in combination with the following packetization algorithm.

In accordance with this embodiment of the invention, the standard packetization algorithm is modified so that the last chunk of data eligible to be sent to the client by the server is split into two packets: the larger one containing all data except for the last byte and a second packet containing a single remaining byte of data.

If these packets were sent in order, the client would not be obligated to acknowledge the receipt of the last-byte packet since it is obviously not a "full-sized" packet (see RFC 2581 quoted above). But if the server intentionally reorders these packets according to the procedure described above, then the client will be forced to send ACKs for both of them. Any performance degradation due to the client receiving the last-byte packet first is negligible for all practical purposes. Indeed, for TCP the size of this last-byte packet will only be 41 byte (40 bytes for used for a TCP/IP header plus one byte of data).

Figure 5:
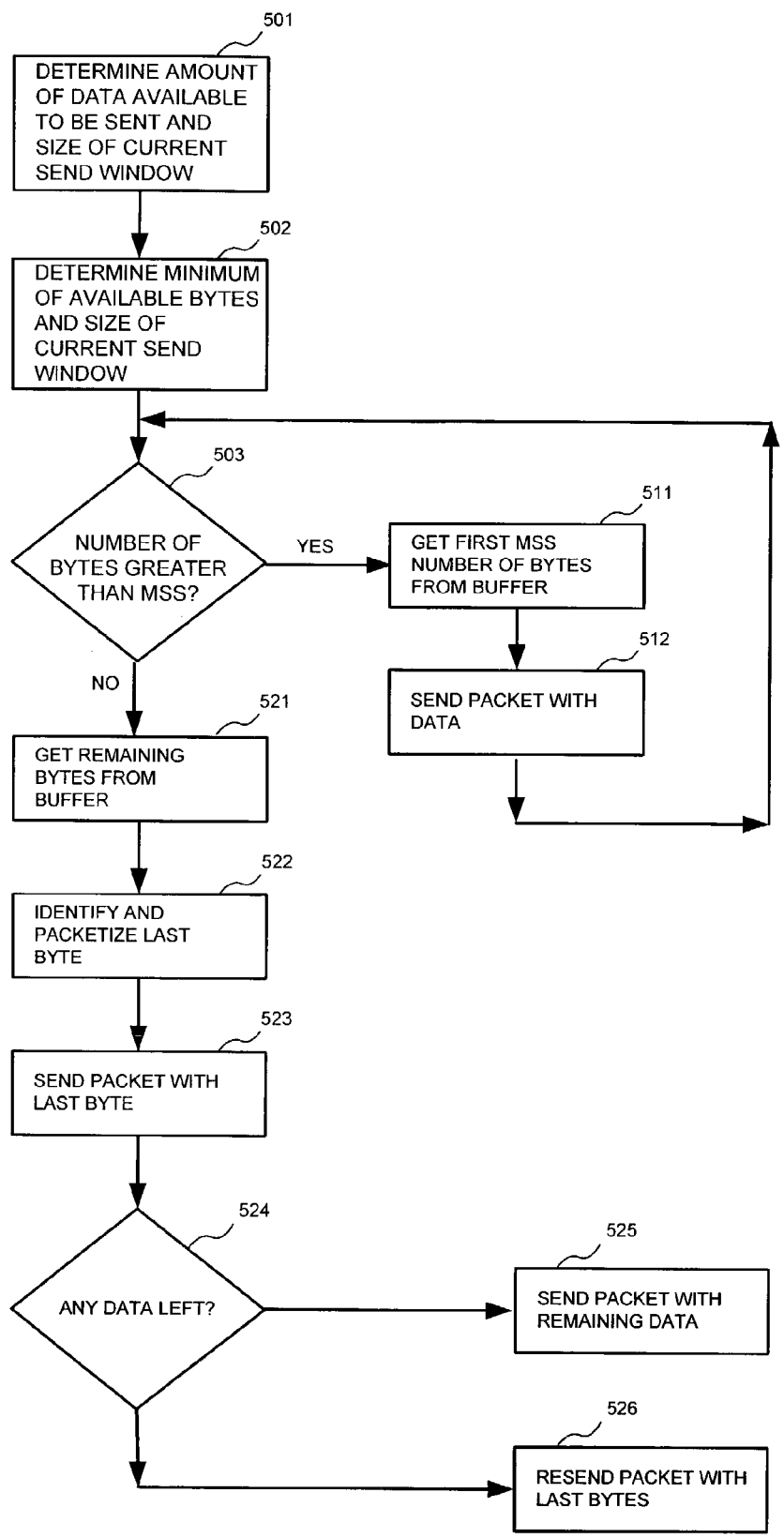
FIG. 5 is a flow chart depicting another implementation of the invention.

FIG. 5 is a flowchart depicting the processing of messages in communication between client and server in this embodiment of the invention. At step 501, the sending host determines the amount of data available to be sent and the size of the current send window. At step 502 the number of bytes of data to be sent in the send window is determined as the minimum of the number of bytes of data available to be sent and the size of the send window. A test is then made at step 503 whether the number of bytes remaining to be sent exceeds the MSS that can be transmitted in a data packet. If the data to be transmitted exceeds MSS, the sending host gets the first MSS bytes at step 511 and packetizes this data and sends it at step 512. The host then returns to step 503.

When the test at step 503 finally fails, the sending host retrieves the remaining bytes from the buffer at step 521. Next, at step 522, it identifies the last byte of that data and packetizes it. It then sends the packet with the last byte of data at step 523. Next, at step 524, it tests if any data remains in what was retrieved at step 521. If there is, it packetizes that data and sends it at step 525. Thus, the last two packets are sent-out-of-order. If no data remains, at step 526 it resends the packet with the last byte of data that had been sent previously at step 523.

Figure 6:
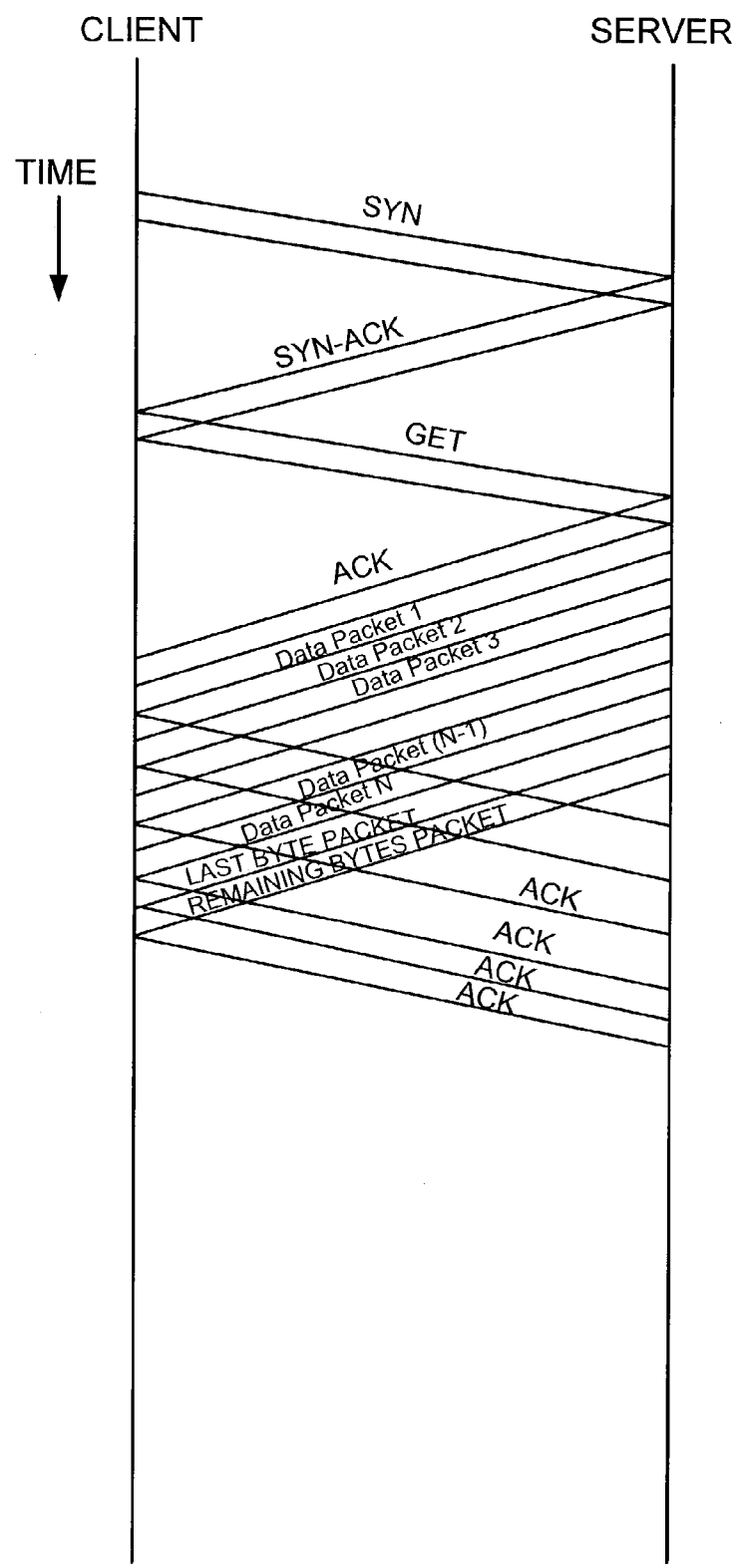
FIG. 6 is a timing diagram indicating message flow between client and server in another preferred embodiment of the invention.

FIG. 6 is a timing diagram illustrating the transmission of the data packets generated by the steps of FIG. 5.

It will be appreciated that the advantages of nonstandard packetization and reordering do not necessarily require that the original data block be separated into just two parts; or that one of these parts contain exactly one single byte; or that all such parts be non-overlapping. As an example, consider a scheme which sends the last byte as one packet, then all the remaining bytes, then sends the last two bytes as a third packet. In this variant, if the "large" packet gets lost, the subsequent two-byte packet will trigger new ACKs from the client, helping the server to realize that the large packet was lost.

Other Considerations

The preferred embodiment of the invention employs the duplication of low-overhead packets (SYN-ACKs, ACKs for data requests) combined with the described non-standard packetization scheme that splits the last packet in a window into two and sends the resulting two packets in a reverse order.

It will be appreciated that various aspects of the embodiments described above are present to cater to particular aspects of the current TCP protocol and the server-side implementation of the protocol stack. The invention, however, applies more widely to any system where a similar problem is faced. In particular, the principles can be applied to a client's TCP implementation, or to any protocol such as TCP, where reliable delivery is required and a system of explicit acknowledgements is used to ensure reliability in the face of packet loss. Thus, the foregoing description is not intended to be exhaustive or to limit the invention to the precise forms disclosed. Many modifications and variants will be evident to those skilled in the art in view of the above teaching. The embodiments presented are chosen in order to best explain the inventions and its current practical applications.

What is claimed is:

1. In a communication protocol wherein, in response to a message communicated from a first terminal to a second terminal, a message is transmitted from the second terminal to the first terminal acknowledging receipt of the message communicated from the first to the second terminal, a method for reducing communication delays arising from lost messages comprising:
   sending a first message from one terminal to the other; and
   without waiting for receipt of a second message acknowledging receipt of the first message, sending a duplicate of the first message or a message duplicating some part of the data contained in the first message from said one terminal to the other at a predetermined time after sending the first message, wherein the predetermined time is a configurable constant or a variable depending on a round trip time (RTT) associated with transmission between the first and second terminals;
   wherein the communication protocol is the Transmission Control Protocol (TCP).

2. The method of claim 1 wherein said duplicate message is sent if said one terminal has not received said second message acknowledging receipt before a timeout period expires.

3. The method of claim 1 wherein the first message is SYN, SYN-ACK or ACK of a SYN-ACK.

4. The method of claim 1 wherein the first message is a data packet.

5. The method of claim 1 wherein the first message is the last data packet in a message window.

6. The method of claim 1 wherein the message that is duplicated is one or more of the last data packets being communicated in a message window.

7. The method of claim 1 wherein the message that is duplicated is the last byte of the last data packet being communicated in a message window.

8. The method of claim 1 wherein the message that is duplicated is at least the last two bytes of the last data packet being communicated in a message window.

9. The method of claim 1 wherein each of at least the last two bytes of the last data packet is transmitted out-of-order.

10. The method of claim 1 further comprising the steps of splitting the last packet in a message window into first and second packets and transmitting the first and second packets out-of-order.

11. The method of claim 1 further comprising the steps of splitting any data remaining to be transmitted after transmission of the last full data packet in a packet window into first and second packets and transmitting the first and second packets out-of-order.

12. The method of claim 11 wherein the first packet contains only the last byte of data to be transmitted.

13. In a communication protocol wherein, in response to a message communicated from a first terminal to a second terminal, a message is transmitted from the second terminal to the first terminal acknowledging receipt of the message communicated from the first to the second terminal, a method comprising:

- at the end of transmission of a packet window, splitting the last packet into first and second packets and transmitting the first and second packets out-of-order, wherein the first packet contains only the last byte of data being transmitted;
- wherein the communication protocol is the Transmission Control Protocol (TCP).

14. In a communication protocol wherein, in response to a message communicated from a first terminal to a second terminal, a message is transmitted from the second terminal to the first terminal acknowledging receipt of the message communicated from the first to the second terminal, a method for reducing communication delays arising from lost messages comprising:

- at the end of the transmission of a packet window, splitting any data remaining to be transmitted after transmission of the last full data packet in a packet window into first and second packets and transmitting the first and second packets out-of-order, wherein the first packet contains only the last byte of data being transmitted;
- wherein the communication protocol is the Transmission Control Protocol (TCP).

15. A method wherein, in response to a message communicated from a first terminal to a second terminal, a message is transmitted from the second terminal to the first terminal acknowledging receipt of the message communicated from the first to the second terminal, comprising:

- at the beginning of a communication session between the first and second terminals sending from one terminal at least one duplicate of a first message without waiting for a second message acknowledging receipt of the first message, wherein the sending of the duplicate of the first message occurs at a predetermined time that is a configurable constant or a variable depending on a round trip time (RTT) associated with transmission between the first and second terminals; and
- at the end of the communication session sending from one terminal at least one duplicate of a third message without first waiting for a fourth message acknowledging receipt of the third message, wherein the sending of the duplicate of the third message occurs at a predetermined time that is a configurable constant or a variable depending on a round trip time (RTT) associated with transmission between the first and second terminals;
- wherein the communication protocol is the Transmission Control Protocol (TCP) and does not use negative acknowledgements (NACKs).

16. The method of claim 15 wherein the first message is SYN, SYN-ACK or ACK of a SYN-ACK.

17. The method of claim 15 wherein the first message is at least one of SYN, SYN-ACK or ACK of a SYN-ACK and each first message is sent without first waiting for such message to be acknowledged.

18. The method of claim 15 wherein the third message is a data packet.

19. The method of claim 15 wherein the third message is the last data packet in a message window.

20. The method of claim 15 wherein the third message that is duplicated is one or more of the last data packets being communicated.

21. The method of claim 15 wherein the third message that is duplicated is the last byte of the last data packet being communicated.

22. The method of claim 15 wherein the third message that is duplicated is at least the last two bytes of the last data packet being communicated.

* * * * *